United States Patent [19]
Wheeler

[11] Patent Number: 6,110,985
[45] Date of Patent: Aug. 29, 2000

[54] CONSTRAINED LAYER DAMPING COMPOSITIONS

[75] Inventor: Maurice E. Wheeler, Ashtabula, Ohio

[73] Assignee: Soundwich, Inc., Cleveland, Ohio

[21] Appl. No.: 09/183,973

[22] Filed: Oct. 30, 1998

[51] Int. Cl.[7] ..................................................... C08J 9/00
[52] U.S. Cl. ........................... 521/83; 521/101; 521/134; 521/139; 521/140; 521/150
[58] Field of Search .............................. 521/83, 101, 134, 521/139, 140, 150

[56] References Cited

U.S. PATENT DOCUMENTS

| | | |
|---|---|---|
| 3,740,353 | 6/1973 | Patrick et al. . |
| 3,770,560 | 11/1973 | Elder et al. . |
| 3,894,169 | 7/1975 | Miller . |
| 4,118,258 | 10/1978 | Graveron et al. . |
| 4,133,932 | 1/1979 | Peck . |
| 4,191,798 | 3/1980 | Schumacher et al. . |
| 4,456,705 | 6/1984 | McCarthy . |
| 4,468,499 | 8/1984 | Siegfried et al. . |
| 4,495,240 | 1/1985 | McCarthy . |
| 4,511,679 | 4/1985 | Ariyoshi et al. ........................... 521/83 |
| 4,734,323 | 3/1988 | Sato et al. . |
| 4,740,427 | 4/1988 | Ochiumi et al. . |
| 4,851,271 | 7/1989 | Moore, III et al. . |
| 4,883,717 | 11/1989 | Kitamura et al. . |
| 4,887,788 | 12/1989 | Fischer et al. . |
| 4,987,194 | 1/1991 | Maeda et al. . |
| 5,008,324 | 4/1991 | Killgoar, Jr. et al. . |
| 5,066,708 | 11/1991 | Koller, Sr. et al. . |
| 5,143,755 | 9/1992 | Moore, III et al. . |
| 5,162,156 | 11/1992 | Troughton, Jr. et al. . |
| 5,190,986 | 3/1993 | Allen et al. . |
| 5,213,879 | 5/1993 | Niwa et al. . |
| 5,271,612 | 12/1993 | Yada et al. . |
| 5,300,355 | 4/1994 | Mifune et al. . |
| 5,318,837 | 6/1994 | Yoshinaka et al. ...................... 428/328 |
| 5,350,610 | 9/1994 | Mashita et al. . |
| 5,635,562 | 6/1997 | Malcolm ................................. 528/108 |

OTHER PUBLICATIONS

"Anti damping and thermoplastic elastmer VS–POLY-MER", Kuraray Co., Ltd., Tokyo, Japan, Aug. 1993, pp. 1–15.
"Damping and thermoplastic rubber VS–POLYMER", Kuraray Co., Ltd., Toyko, Japan, Aug. 1995, pp. 1–15.
"HYBRAR—New TPE with Vibration Damping Effect—", Kuraray Co., Ltd., Tokyo, Japan, Mar. 11, 1993, pp. 1–14.
"Kirk–Othmer Concise Encyclopedia of Chemical Technology", John Wiley & Sons, Inc., 1985, pp. 518–521.

*Primary Examiner*—John M. Cooney, Jr.
*Attorney, Agent, or Firm*—Pearne & Gordon LLP

[57] ABSTRACT

A constrained layer damping structure is provided, including a panel to be damped, a constraining layer and a layer of foam vibration damping material sandwiched therebetween. The foam vibration damping material is provided from a composition including 1–20 weight percent elastomeric polymer, 20–60 weight percent thermoplastic polymer, 0.5–18 weight percent tackifier, 4–23 weight percent asphalt filler, 20–50 weight percent inorganic filler and 0.2–7 weight percent blowing agent.

20 Claims, 1 Drawing Sheet

CONSTRAINED LAYER DAMPING COMPOSITIONS

FIELD OF THE INVENTION

The invention relates to constrained layer damping compositions and more particularly to expandable constrained layer vibration damping compositions and structures using said compositions.

DESCRIPTION OF RELATED ART

It is a goal in the automotive industry to reduce and minimize the amount of noise produced by the automobile, particularly noise inside the passenger compartment. It is known to use constrained layer damping structures and materials to reduce the vibration of the automobile body panels and thereby reduce the noise produced by the automobile. See U.S. Pat. Nos. 5,635,562; 4,987,194; and 5,143,755, the contents of which are hereby incorporated by reference. However, there is a need for more effective constrained layer structures having improved or more effective vibration damping materials which provide increased stiffness and reduced sound transmission. For a given mass, increased stiffness shifts the natural vibrational frequency of a panel to a higher frequency which is more easily damped by a constrained layer structure.

SUMMARY OF THE INVENTION

A vibration damping composition is provided comprising 1–20 weight percent elastomeric polymer, 20–60 weight percent thermoplastic polymer, 0.5–18 weight percent tackifier, 4–23 weight percent asphalt filler, 20–50 weight percent inorganic filler and 0.2–7 weight percent blowing agent. A constrained layer damping structure is also provided, comprising a panel to be damped, a constraining layer and a layer of foam vibration damping material sandwiched between the panel and the constraining layer.

DETAILED DESCRIPTION OF THE PREFERRED EMBODIMENTS OF THE INVENTION

Figure 1:
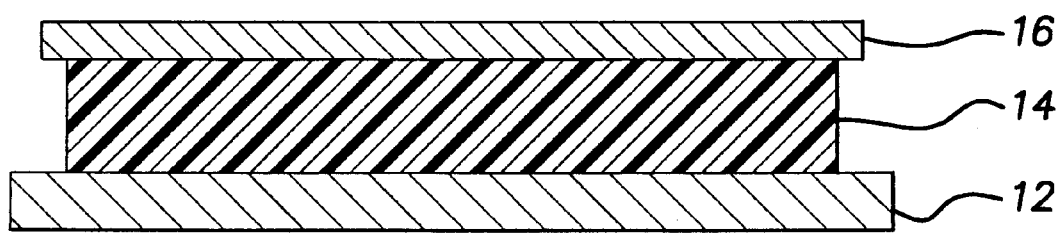
FIG. 1 is a schematic, cross-sectional view of a constrained layer damping structure of the present invention.

As used herein, parts are parts by weight and percentages are weight percents unless otherwise indicated or apparent. When a preferred range such as 5–25 is given, this means preferably at least 5 and preferably not more than 25.

With reference to FIG. 1 there is shown schematically a constrained layer damping structure having a panel 12 to be damped, such as a metal automobile body panel, a layer 14 of vibration damping material according to the present invention, and a constraining layer 16. The panel 12 to be damped is preferably a steel sheet (preferably cold rolled) about 0.66–0.76 mm or about 0.026 inches or about 0.030 inches thick, less preferably thicker or thinner, less preferably aluminum or composite sheets. The constraining layer 16 is usually thinner than panel 12; layer 16 is preferably sheet steel about 0.020, less preferably 0.012–0.030, inches thick. Optionally in some applications layer 16 may be 0.006–0.012 inches thick. Layer 16 may less preferably be aluminum or composite. Layer 14 of vibration damping material, prior to expansion, is preferably 0.5–2.5, more preferably 0.5–2, more preferably 0.75–1.5, more preferably 0.85–1.2, more preferably about 1, mm thick. Layer 14, after expansion, is a foam 1–4, more preferably 1–3, more preferably 1.2–2, more preferably about 1.5, mm thick. As can be seen, this expanded thickness of damping foam is equal to the standoff distance or separation distance or gap between panel 12 and layer 16. Layer 14 during expansion preferably expands 50–200% to fill the gap.

The invented vibration damping composition used for layer 14 has the following preferred formulation.

| Ingredient | Preferred Weight Percent | Less Preferred Weight Percent | Less Preferred Weight Percent |
|---|---|---|---|
| 1. Elastomeric polymer | about 3.9 | 2–12 or 2–10 or 3–8 or 3–6 | 1–20 |
| 2. Thermoplastic polymer | about 46.5 | 29–55 or 38–51 or 42–50 | 20–60 |
| 3. Tackifier | about 4 | 1–14 or 2–11 or 3–7 | 0.5–18 |
| 4. Asphalt filler | about 10.2 | 5–20 or 7–17 or 8–14 | 4–23 |
| 5. Inorganic filler | about 33 | 25–40 | 20–50 |
| 6. Blowing agent | about 1 | 0.7–3 | 0.2–7 |
| 7. Activator | about 0.44 | 0.2–0.8 | 0.1–2 |
| 8. Colorant | about 0.5 | 0.2–0.9 | 0.1–2 |
| 9. Processing aid | about 0.8 | 0.4–1.2 | 0–2 or 0.1–2 |

The elastomeric polymer provides damping characteristics and is based on natural or synthetic rubbers or mixtures thereof. The elastomeric polymer is preferably synthetic rubber such as styrene-butadiene copolymers, polyisobutylene, and ethylene-propylene diene terpolymers, more preferably styrene isoprene rubber, more preferably polystyrene polyisoprene tri-block copolymers styrene-isoprene-styrene, (S-I-S) block copolymers, more preferably Kraton rubbers such as Kraton D-1107 and Kraton 1112P from Shell Chemical or SOLT 190 from Enichem, most preferably VS-1 from Kuraray Co. of Japan, a tri-block copolymer including both polystyrene and vinyl-bonded polyisoprene blocks with the isoprene mid-blocks exhibiting extensive 3,4 polymerization. The ratio of polystyrene to vinyl-bonded polyisoprene in the tri-block copolymer is preferably about 1:4.

The thermoplastic polymer performs some damping and modifies the viscosity and is preferably ethylene vinyl acetate (EVA), less preferably ethylene copolymers such as ethylene methyl acrylate or ethylene ethyl acrylate, less preferably amorphous polypropylene or polybutylene, less preferably polyethylene or polypropylene.

The tackifier or adhesion agent causes the composition to adhere or bond sufficiently and effectively to the substrate or panel to be damped, typically an automobile sheet metal panel, and the constraining layer, preferably without necessitating special surface preparation of the panel or constraining layer and preferably without inhibiting the flow of the composition during the blowing stage. The sheet metal panel and constraining layer could in some cases have been primed, painted or coated with lubricant. The tackifier or adhesion agent is preferably one or more of the following tackifiers: terpene resins, terpene-phenol resins, rosins, aromatic hydrocarbon tackifiers, polyterpene resins, more preferably $C_5$ and $C_9$, hydrocarbon resins (such as petroleum-based), more preferably Wingtack resins such as Wingtack 86 from Goodyear and Resinex resins such as Resinex 100F from Harwick.

The asphalt filler acts as a filler and is not a plasticizer in the invented formulation. The present invention is free from the presence of plasticizer. The asphalt filler is asphalt, such as blown (oxidized) or unblown or straight asphalt or monor asphalt from, for example, Sun Company, preferably about 25–75%, more preferably about 40–60%, monor and about 25–75%, more preferably about 40–60%, blown asphalt.

The inorganic filler is preferably calcium carbonate, dolomite, limestone, clay, talc, mica, silica, silicates known in the art, and other mineral fillers, preferably particle size 25–250 microns.

The blowing agent is preferably azodicarbonamide or p,p'-oxybis-(benzene sulfonyl hydrazide), such as Kempore 200 or other Kempore, Unicell OH or other Unicell, Celogen OT, Celogen 754 or other Celogen, or other blowing agents known in the art. The blowing agent may be, and is preferably, predispersed in a compatible carrier base such as EVA to carry it into the formulation. When the blowing agent is predispersed in a carrier base, it is also preferred to combine therewith an activator. Preferably about 0.44 parts activator and about 1.4 parts carrier are combined with 1 part blowing agent, such as Kempore 200. The blowing agent produces a foam vibration damping material and facilitates intimate contact between the vibration damping material layer and both the panel to be damped and the constraining layer.

The activator is preferably ZnO, as known in the art to activate the blowing agent. Other activators may also be used.

The colorant is preferably carbon black, preferably predispersed in an equal amount of a carrier such as EVA.

The processing aid is preferably a zinc, calcium or magnesium soap or fatty acid soap or combination thereof, preferably a zinc soap or zinc salt of fatty acids, such as Promix 100-ZS from Flow Polymers, Struktol A60 from Struktol, Proaid 9810 or 9831 from Akrochem, or various Aktiplast compounds from Rhein Chemie.

Optionally, 0–2%, more preferably about 1%, moisture absorbent such as CaO can be added if there is excessive moisture in the composition. Optionally 0.05–0.8, more preferably about 0.1–0.4, weight percent activator such as Zn-dibenzene sulfinate (Unicell-BM) can be added to lower the blowing or activation temperature. Less preferably other additives known in the art may be added.

The amounts and ranges of elastomeric polymer, thermoplastic polymer, asphalt filler and inorganic filler permits the formulation to be customized for specific applications accounting for service temperature and a balance of sound transmission reduction and vibrational damping.

The vibration damping material is compounded as known in the art, such as by blending and pelletizing at about 300–400° F., more preferably at about 350° F., Ingredients 1–5 and 8–9 in the preferred formulation above, blending and pelletizing at less than 270° F. the blowing agent and the activator with a compatible carrier base such as EVA, then blending both sets of pellets in a ribbon blender or other blender. As known in the art, the blowing agent and/or activator can be obtained predispersed in a compatible carrier base, such as for example Phoenix Superblo-LT from Phoenix Color and Compounding, Inc., Sandusky, Ohio.

The blend is then extruded at less than 270° F., preferably about 250–269° F., in sheet form. The extrusion temperature must remain below the blowing agent activation temperature. Alternatively a twin screw extruder with metered feed may be used with the two sets of pellets mentioned above.

To make a constrained layer damping structure such as shown in FIG. 1, a sheet of expandable vibration damping material is die cut to the desired shape and bonded or attached to a substrate or panel to be damped, such as an automobile body panel, or to a constraining sheet or layer, by methods known in the art, such as heat staking or mechanical fasteners. Less preferably adhesive may be used if necessary. The second outer sheet is then attached to the first outer sheet with the damping material therebetween to form a sandwich structure of the three layers; however the two outer sheets are preferably attached with a standoff or offset as known in the art (such as by using embossments to separate the sheets) so that the inner expandable material layer occupies about ⅔ of the distance between the two outer sheets, to allow for subsequent expansion. The constrained layer damping structure is then heated to expand and foam the vibration damping material. When the panel to be damped is an automobile panel, the vehicle passes through the E-coat process and the bake oven. During the E-coat bake cycle the blowing agent is activated and the vibration damping material expands, filling the space or gap between the two outer layers to provide the structure shown in FIG. 1. The E-coat bake cycle is typically about 10 min. at 180° C. to about 30 min. at 205° C. For further information on the above, see U.S. Pat. Nos. 4,456,705; 4,734,323; 5,213,879; 5,271,612; 5,300,355; and 5,635,562, the contents of all of which are incorporated herein by reference. Similar techniques can be used in other applications of the invention.

In automotive applications such as the face of the wheel well away from the wheel, the dashboard, the floor boards, the roof, the firewall and other applications, the area to be damped is analyzed for both vibrational and transmission properties. To minimize weight and cost, the area to be covered by a constrained layer damping structure or damping system is optimized to the minimum area required to achieve the desired sound and vibration reduction. For example, in the automotive wheel well a metal constraining layer of the preselected dimensions is stamped to conform to the wheel well surface and be offset therefrom a fixed distance corresponding to the final thickness of the foam vibration damping material layer.

The invented vibration damping material composition, in its unexpanded state, preferably has the following physical properties: specific gravity of 1.2–1.4, more preferably about 1.3; 50% maximum ash content (ASTM D-297); Shore A durometer hardness of 70–90, more preferably about 80 or 85; no cracking after a flexibility test of bending a 50×25×1 mm sample 180 times by hand; tear strength of at least 11, more preferably at least 12, 16, 19 or 21 kN/m (ASTM D624, Die C); elongation at break of at least 80, more preferably at least 90, 100, or 120, percent (ASTM D638); tensile strength of at least 1.6, more preferably at least 2 or 2.5, Mpa (ASTM D638).

The invented vibration damping material, in its expanded or foamed state, preferably has the following physical and noise control properties: volume expansion of 50–220%, more preferably 100–200%, more preferably 120–150% (FLTM BV 108–02); maximum water absorption of 5%, more preferably 2% (FLTM BV 117-01); lap shear adhesion between bonded metal layers (ASTM D1002) minimum of 6160 N/m, more preferably 7000 or 7500 or 8500 N/m, preferably via cohesive failure mode; fogging minimum of 70, more preferably 80 or 90 (FLTM BO 116-03, 3 hr at 100° C.); transmission loss (SAE J1400, 24"×24"×0.026" steel) of 20 dB at 125 Hz, 25 dB at 250 Hz, and 30 dB at 500 Hz; stiffness of 0.8, more preferably 0.6, more preferably 0.5, more preferably 0.4, inches maximum deflection (cantilever bending test, 0.060" expanded polymer material to be tested is heat bonded between two steel plates 1.5"×10.5"×0.017", clamped at one end so as to leave a 9" overhang or bending length with a 300 g weight in the free end, deflection of free end measured at ambient temperature); damping loss factor at 200 Hz by Oberst test method (base bar 300×20×0.76 mm; constraining bar 280×20×0.76 mm; both bars cold rolled steel; final expanded polymer material thickness 1.5 mm (SAE J1637)) as follows

|  | 10 Min./180° C. Bake | 30 Min./205° C. Bake |
| --- | --- | --- |
| 0° C. | 0.05 | 0.04 |
| 15° C. | 0.13 | 0.13 |
| 23° C. | 0.19 | 0.20 |
| 30° C. | 0.19 | 0.20 |
| 45° C. | 0.14 | 0.17 |
| 60° C. | 0.10 | 0.13 |

The following Example further illustrates various aspects of the invention.

Example 1

25.52 parts EVA (18% vinyl acetate, 30 melt), 33.176 parts dolomite filler (20 mesh), 5.104 parts asphalt (Asphalt A from Koch), 1.9 parts VS-1 from Kuraray Co., 12.75 parts EVA (AT-1845 from AT Plastics), 7.8 parts EVA (AT-2850M from AT Plastics), 1 part zinc salt processing aid (Promix 100-ZS from Flow Polymers), 4.95 parts asphalt (75% monor, 25% blown asphalt), 3 parts tackifier (Wingtack 86), 1 part CaO (moisture absorbent), and 0.8 parts AT822 from AT Plastics (50% carbon black, 50% EVA carrier base) were dry blended and pelletized to yield 97 parts non-expanding base pellets. 0.9 parts Kempore 200, 0.15 parts Unicell OH, 0.45 parts ZnO and 1.5 parts EVA carrier base were blended, compounded and pelletized to yield 3 parts blowing agent pellets (available as Phoenix Superblo-LT). Then 97 parts of non-expanding base pellets were mixed and blended with 3 parts blowing agent pellets and then extruded at about 250–270° F. into a sheet 1 mm thick. This sheet was tested, with the following results: specific gravity of 1.32; Shore A durometer of 85; Tear (Die C) of 144 lb/in (25200 N/m); tensile strength of 476 lb/in$^2$ (3280000 N/m$^2$ or 3.28 Mpa); elongation at break of 290%. After expansion between two metal sheets, this layer showed the following test results: peel adhesion (lap shear) of 48 lb/in (8400 N/m) cohesive failure; vertical expansion of 140% at 10 min./180° C. and 149% at 30 min./205° C.; volume expansion of 143% at 10 min./180° C. and 147% at 30 min./205° C.; and damping loss factors at 200 Hz by Oberst test method as set forth above where preferred noise control properties are set forth.

Although the preferred embodiments of the invention have been shown and described, it should be understood that various modifications and changes may be resorted to without departing from the scope of the invention as disclosed and claimed herein.

What is claimed is:

1. A vibration damping composition comprising 1–20 weight percent elastomeric polymer, 20–60 weight percent thermoplastic polymer, 0.5–18 weight percent tackifier, 4–23 weight percent asphalt filler, 20–50 weight percent inorganic filler and 0.2–7 weight percent blowing agent.

2. A vibration damping composition according to claim 1, wherein said elastomeric polymer is selected from the group consisting of styrene-isoprene-styrene (S-I-S) block copolymers.

3. A vibration damping composition according to claim 1, wherein said elastomeric polymer is a tri-block copolymer including both polystyrene and vinyl-bonded polyisoprene blocks with the isoprene mid-blocks exhibiting extensive 3,4 polymerization.

4. A vibration damping composition according to claim 1, wherein said thermoplastic polymer is selected from the group consisting of ethylene vinyl acetate, ethylene methyl acrylate, and ethylene ethyl acrylate.

5. A vibration damping composition according to claim 1, wherein said tackifier is selected from the group consisting of $C_5$ and $C_9$ hydrocarbon resins.

6. A vibration damping composition according to claim 1, further comprising an effective amount of activator to activate said blowing agent.

7. A vibration damping composition according to claim 1, further comprising an effective amount of colorant to color the composition.

8. A vibration damping composition according to claim 1, further comprising an effective amount of processing aid to aid the processing of the composition.

9. A vibration damping composition according to claim 1, comprising 2–10 weight percent elastomeric polymer, 29–55 weight percent thermoplastic polymer, 2–11 weight percent tackifier, 7–17 weight percent asphalt filler and 25–40 weight percent inorganic filler.

10. A vibration damping composition according to claim 9, wherein said elastomeric polymer is a tri-block copolymer including both polystyrene and vinyl-bonded polyisoprene blocks with the isoprene mid-blocks exhibiting extensive 3,4 polymerization and said thermoplastic polymer is ethylene vinyl acetate.

11. A vibration damping composition according to claim 1, said composition consisting essentially of said elastomeric polymer, said thermoplastic polymer, said tackifier, said asphalt filler, said inorganic filler, and said blowing agent.

12. A constrained layer damping structure comprising a panel to be damped, a constraining layer and a layer of foam vibration damping material sandwiched between said panel and said constraining layer, said layer of foam vibration damping material comprising 1–20 weight percent elastomeric polymer, 20–60 weight percent thermoplastic polymer, 0.5–18 weight percent tackifier, 4–23 weight percent asphalt filler and 20–50 weight percent inorganic filler.

13. A constrained layer damping structure according to claim 12, wherein said panel is an automobile body panel.

14. A constrained layer damping structure according to claim 13, wherein said automobile body panel is metal.

15. A constrained layer damping structure according to claim 12, wherein said elastomeric polymer is a tri-block copolymer including both polystyrene and vinyl-bonded polyisoprene blocks with the isoprene mid-blocks exhibiting extensive 3,4 polymerization.

16. A constrained layer damping structure according to claim 12, wherein said thermoplastic polymer is selected from the group consisting of ethylene vinyl acetate, ethylene methyl acrylate, and ethylene ethyl acrylate.

17. A constrained layer damping structure according to claim 12, wherein said tackifier is selected from the group consisting of $C_5$ and $C_9$ hydrocarbon resins.

18. A constrained layer damping structure according to claim 12, wherein said foam vibration damping material comprises 2–10 weight percent elastomeric polymer, 29–55 weight percent thermoplastic polymer, 2–11 weight percent tackifier, 7–17 weight percent asphalt filler and 25–40 weight percent inorganic filler.

19. A constrained layer damping structure according to claim 18, wherein said elastomeric polymer is a tri-block copolymer including both polystyrene and vinyl-bonded polyisoprene blocks with the isoprene mid-blocks exhibiting extensive 3,4 polymerization and said thermoplastic polymer is ethylene vinyl acetate.

20. A constrained layer damping structure according to claim 12, wherein said foam vibration damping material consists essentially of said elastomeric polymer, said thermoplastic polymer, said tackifier, said asphalt filler, and said inorganic filler.

* * * * *